US008132801B2

(12) United States Patent
Miyashita et al.

(10) Patent No.: US 8,132,801 B2
(45) Date of Patent: Mar. 13, 2012

(54) POSITIONING AND CLAMPING APPARATUS

(75) Inventors: Yukihiro Miyashita, Tokyo (JP); Satoshi Miyazaki, Tokyo (JP); Masakazu Tezuka, Tokyo (JP)

(73) Assignee: Koganei Corporation, Tokyo (JP)

( * ) Notice: Subject to any disclaimer, the term of this patent is extended or adjusted under 35 U.S.C. 154(b) by 674 days.

(21) Appl. No.: 12/248,165

(22) Filed: Oct. 9, 2008

(65) Prior Publication Data

US 2009/0096149 A1 Apr. 16, 2009

(30) Foreign Application Priority Data

Oct. 11, 2007 (JP) ................................ 2007-265445

(51) Int. Cl.

*B23Q 1/00* (2006.01)
*B23Q 3/08* (2006.01)
*B23Q 17/00* (2006.01)
*B25B 5/12* (2006.01)
*B25B 1/14* (2006.01)
*B25B 1/20* (2006.01)

(52) U.S. Cl. .............. 269/49; 269/228; 269/24; 269/37; 269/32; 269/28; 29/407.1

(58) Field of Classification Search .................... 269/49, 269/24, 37, 32, 28, 228; 29/407.01
See application file for complete search history.

(56) References Cited

U.S. PATENT DOCUMENTS 4,907,337 A * 3/1990 Krusi .............................. 483/55
6,944,927 B2 * 9/2005 Nakamura ................. 29/407.01

FOREIGN PATENT DOCUMENTS

JP 2002187026 A 7/2002
JP 2003-260626 9/2003
JP 2006263885 A 10/2006

OTHER PUBLICATIONS

Machine Translation of JP 2006263885 Kunio Ikuta Oct. 5, 2006.*
Masakazu Tezuka, Positioning Clamp Device, Sep. 16, 2003. JP 2003260626A Machine Translation.*
Corresponding Japanese Office Action dated Oct. 19, 2010 with English abstract attached.

* cited by examiner

*Primary Examiner* — Monica Carter
*Assistant Examiner* — Nirvana Deonauth
(74) *Attorney, Agent, or Firm* — McCormick, Paulding & Huber LLP

(57) ABSTRACT

A positioning and clamping apparatus clamps a panel material by moving a clamp arm to a clamping position while the panel material positioned by a locating pin is supported by a workpiece supporting face of a workpiece support. An extruding member having a plurality of extruding rods protruding from the workpiece supporting face is slidably provided in the workpiece support, and the panel material is detached from the locating pin since the extruding member causes a tip face of the extruding rods to be moved to a carry-out position by the hollow piston. The extruding member is caused to protrude by a spring force up to a standby position located between the carrying-out position and the workpiece supporting position, thereby being pushed down up to the workpiece supporting position by the panel material.

3 Claims, 12 Drawing Sheets

POSITIONING AND CLAMPING APPARATUS

CROSS-REFERENCE TO RELATED APPLICATION

Applicant hereby claims foreign priority benefits under U.S.C. §119 from Japanese Patent Application No. 2007-265445 filed on Oct. 11, 2007, the contents of which are incorporated by reference herein.

TECHNICAL FIELD OF THE INVENTION

The present invention relates to a positioning and clamping apparatus, which is intended for positioning workpieces at predetermined positions, and, in particular, to a positioning and clamping apparatus, which positions and fixes tabular panel materials constituting an automobile body.

BACKGROUND OF THE INVENTION

Automobile bodies are formed by joining a plurality of tabular panel materials which are workpieces, and when spot welding is performed, there is a need to position and clamp various panel materials constituting the automobile bodies. Therefore, a plurality of positioning and clamping apparatuses are attached to welding stages allocated on automobile production lines in order to position and fix the panel materials. Positioning and clamping apparatuses are mounted to tips of robot arms when the workpieces are clamped and carried out by industrial robots. Positioning and clamping apparatuses are mounted to carrying-out carriages when the workpieces are positioned and clamped by the positioning and clamping apparatuses.

In any case, a conventional positioning and clamping apparatus is configured to fit a locating pin in a positioning hole formed in a panel material to position the panel material, and clamp the panel material by a clamp arm built into a slit formed in the locating pin. It is necessary to detect whether or not the panel material is fitted in the locating pin and positioned at a predetermined position when the panel material is clamped, and the positioning and clamping apparatus including such detecting means, for example, is disclosed in Patent Document 1 (Japanese Patent Application Laid-Open Publication No. 2003-260626).

SUMMARY OF THE INVENTION

After completion of welding work et al. under the state in which the panel material is clamped by the clamp arm of the clamping apparatus, clamping of the panel material by the clamp arm is to be released, and the panel material is carried out to a subsequent process by a workpiece carrier apparatus et al. after the clamping is released. In this carry-out operation, there is a problem that because the panel material is moved upward along the locating pin, released from the locating pin, and moved horizontally toward the subsequent process, the panel material cannot be detached smoothly due to tight contact between the locating pin and the panel material when the panel material is moved upward.

An object of the present invention is to provide a positioning and clamping apparatus which positions and clamps a panel material at a locating pin, and detaches, from the locating pin, the panel material whose clamping is released.

A positioning and clamping apparatus according to the present invention comprises: a workpiece support including a workpiece supporting face, with which a panel material contacts on its tip; a locating pin protruding from the workpiece supporting face to be attached to the workpiece support, the locating pin being fitted in a positioning hole formed in a panel material; a clamp arm accommodated in a slit formed radially openly in the locating pin, the clamp arm being swingable between a clamping position of protruding from the slit to clamp the panel material between the workpiece supporting face and the clamp arm, and a retracted position of entering into the slit; an opening/closing piston incorporated into a cylinder body attached to the workpiece support, attached to a piston rod connected to the clamp arm, and driving the clamp arm to the clamping position and the retracted position through the piston rod; an extruding member mounted axially reciprocably on the workpiece support along the locating pin between a carry-out position where a tip portion of the extruding member protrudes from the workpiece supporting face to extrude the panel material and a workpiece supporting position where the tip portion of the extruding member enters into the workpiece support; and a hollow piston connected to the extruding member to be incorporated into the cylinder body, and driving the extruding member from the workpiece supporting position to the carry-out position.

The positioning and clamping apparatus according to the present invention further comprises: a spring member provided in the cylinder body, and applying a spring force to the extruding member in a forward direction to cause the extruding member to move forward up to a standby position located between the workpiece supporting position and the carry-out position and to cause the extruding member to move backwards up to the workpiece supporting position by weight of the panel material placed on the workpiece supporting face while the extruding member is at the standby position; and a detecting means provided in the cylinder body and detecting a position of the extruding member.

The positioning and clamping apparatus according to the present invention further comprising: a hollow shaft mounted axially reciprocably outside the piston rod and attached to the hollow piston to be relatively movably connected axially to the extruding member; a protruding member provided to one of the hollow shaft and the extruding member; and an engaging groove provided to the other of the hollow shaft and the protruding member, and engaged with the extruding member and extending axially, wherein the extruding member is moved in an idle swing manner with respect to the hollow shaft from the standby position to the workpiece supporting position under a state in which the hollow shaft is moved backward together with the hollow piston.

The positioning and clamping apparatus according to the present invention is such that the detecting means is a magnetic sensor for detecting magnetism of a magnet moved forward and backward between the standby position and the workpiece supporting position together with the extruding member.

The positioning and clamping apparatus according to the present invention further comprises an annular member provided in the cylinder body, and moved forward and backward between the standby position and the workpiece supporting position together with the extruding member, wherein the magnet is attached to the annular member.

According to the present invention, the extruding member protruding from the workpiece-supporting surface and pushing up the panel material is provided, and the panel material is carried out along the locating pin up to the carry-out position in releasing the clamping, whereby the carrying-out of the panel material is facilitated. Because the panel material is pushed down up to the carry-out position, interference between the panel material and the locating pin can be avoided in carrying out the panel material from the carry-out position, so that the panel material can be certainly carried out to the outside.

According to present invention, because the position of the extruding member pushing out the panel material up to the carry-out position is detected, backward motion of the extruding member from the standby position to the workpiece-supporting position by the panel material is detected, so that the mounting of the panel material onto the locating pin can be detected by the extruding member.

BRIEF DESCRIPTIONS OF THE DRAWINGS

DESCRIPTIONS OF THE PREFERRED EMBODIMENTS

Figure 1:
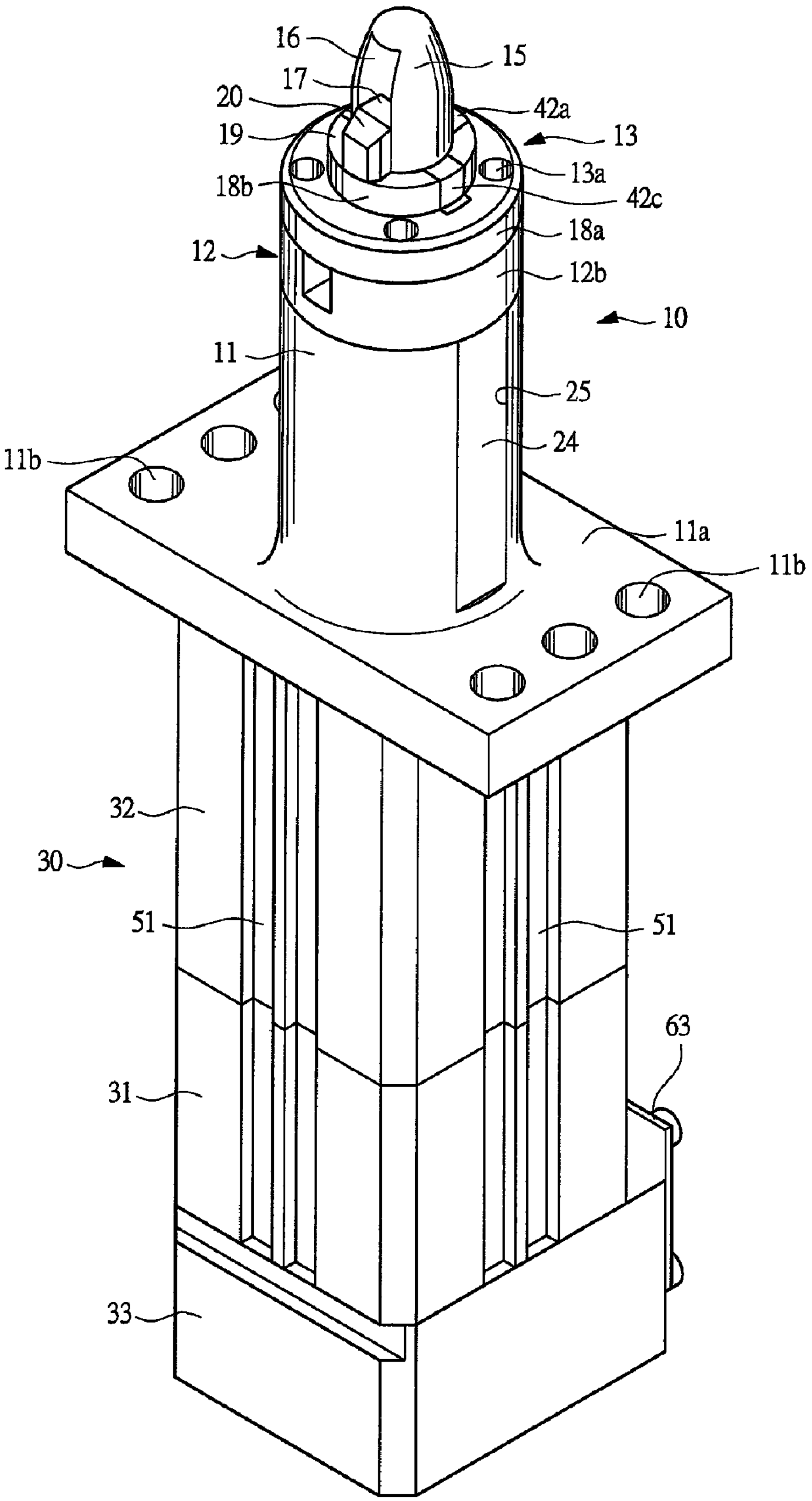
FIG. 1 is a perspective view of a positioning and clamping apparatus according to an embodiment of the present invention.

A positioning and clamping apparatus shown in FIG. 1, which is applied for positioning and fixing a plurality of tabular panel materials P which are workpieces and constitute an automobile body, has a workpiece support 10. The workpiece support 10 has a cylindrical mounting pedestal 11 whose base end portion is united with a quadrate pedestal plate 11*a*. By bolts (not shown) which are attached to attachment holes 11*b* formed in the pedestal plate 11*a*, the workpiece support 10 is attached through a portion of the pedestal plate 11*a* to a supporting member et al. provided on a welding stage of an automobile production line.

Figure 4:
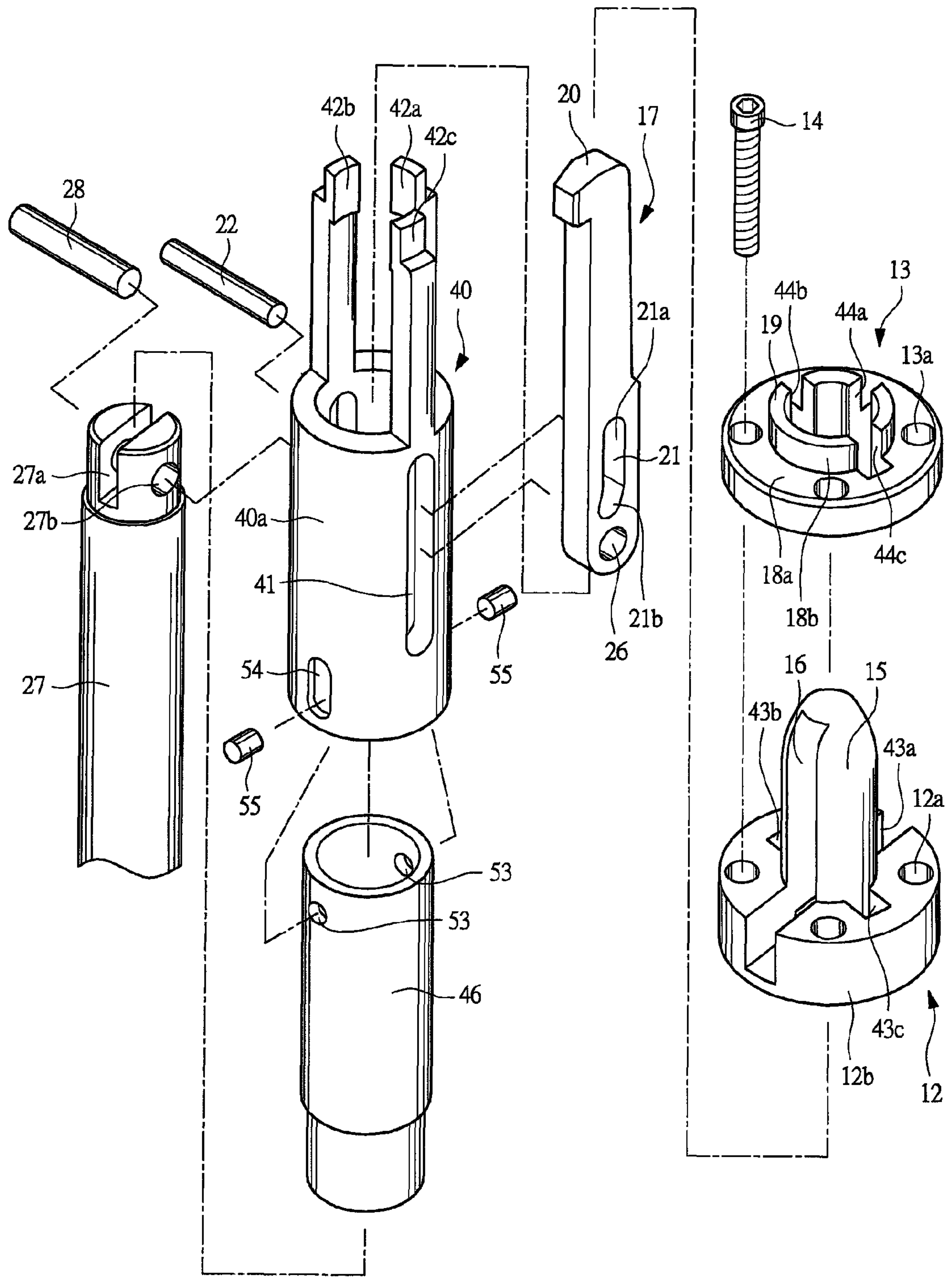
FIG. 4 is an exploded perspective view of members constituting an interior of a workpiece support.

A locating jig 12 is attached to an upper end of the mounting pedestal 11 by a workpiece receiving ring 13. As shown in FIG. 4, the locating jig 12 includes a flange portion 12*b* in which four through-holes 12*a* are formed, and the outer diameter of the flange portion 12*b* is approximately equal to that of the mounting pedestal 11. The locating jig 12 is fastened to the upper end of the mounting pedestal 11 using bolts 14, which are to be attached to bolt attachment holes 13*a* formed in the workpiece receiving ring 13 correspondingly to the through-holes 12*a*.

As shown in FIG. 4, a cylindrical locating pin 15, which extends axially from a flange portion 12*b*, is provided in a locating jig 12. The tip portion of the locating pin 15 is tapered so as to smoothly insert the locating pin 15 into a positioning hole formed in the panel material P, and the base end of the locating pin 15 has an outer diameter corresponding to that of the positioning hole. A slit 16 radially penetrates and opens in the locating pin 15 except for the tip portion of the locating pin 15 and so as to arrive at the flange portion 12*b*, and a clamp arm 17 is accommodated in the slit 16. Thus, a workpiece support 10 is composed of the mounting pedestal 11, the workpiece receiving ring 13, and the flange portion 12*b* of the locating jig 12.

The workpiece receiving ring 13 has, as shown in FIG. 4, a flange portion 18*a* whose outer diameter is approximately equal to that of the mounting pedestal 11 and in which bolt attachment holes 13*a* are formed, and a support portion 18*b* extending axially from the flange portion 18*a*. A base end portion of the locating pin 15 is fitted into the workpiece receiving ring 13, and the locating jig 12 is attached to the mounting pedestal 11 in a state where the locating pin 15 protrudes from a radial-directional center portion of the workpiece receiving ring 13. Since a tip face of the support portion 18*b* serves as a workpiece supporting face 19, the carried-in panel material P becomes in a state of being supported by the workpiece supporting face 19, so that the panel material P is clamped between a clamp piece 20 provided to a tip of the clamp arm 17 and the workpiece supporting face 19. The clamp arm 17 is swingable between a clamping position, as shown by sold lines of FIG. 2, where the clamp piece 20 protrudes from the slit 16 of the locating pin 15 to clamp the panel material P and a retracted position, as shown by double-dot lines of FIG. 2, where the clamp piece 20 enters into the slit 16.

Figure 2:
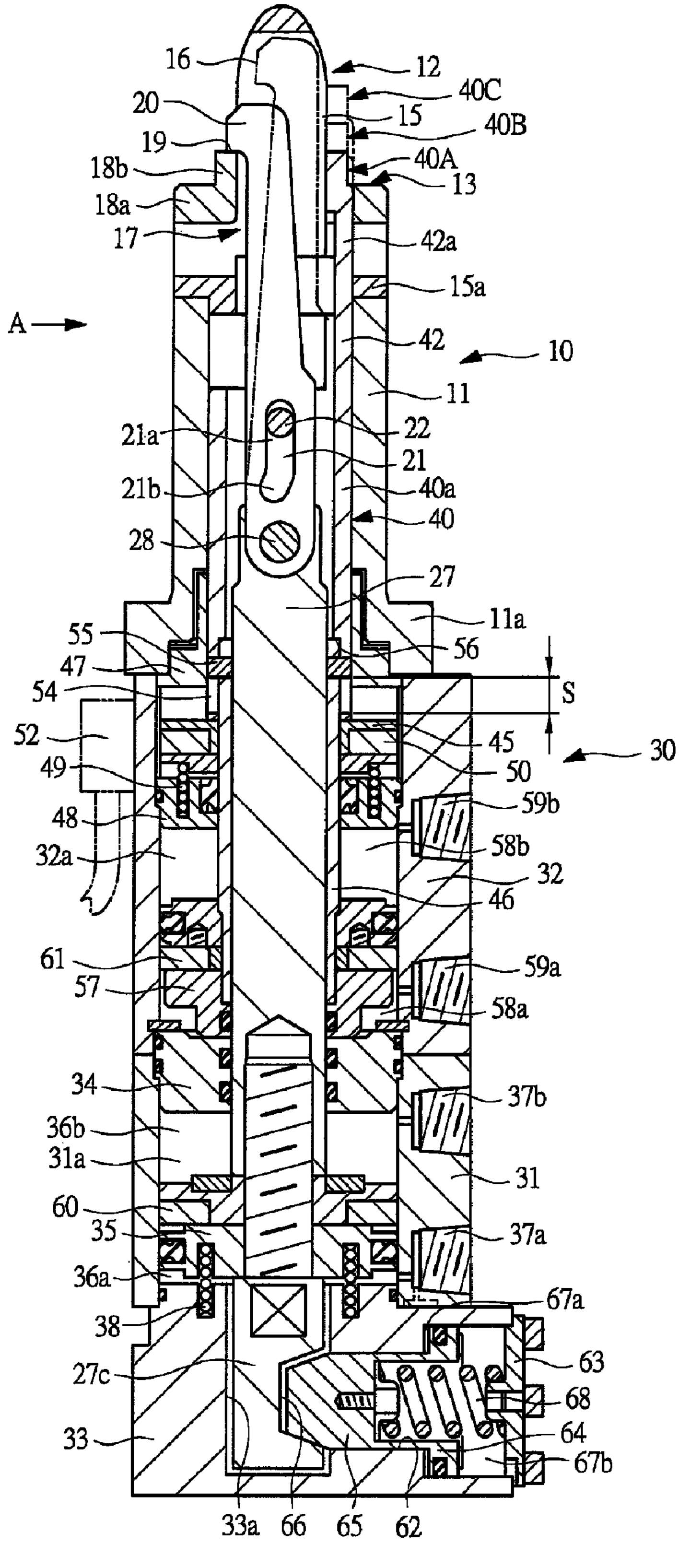
FIG. 2 is a sectional view of a front side in FIG. 1.
Figure 3:
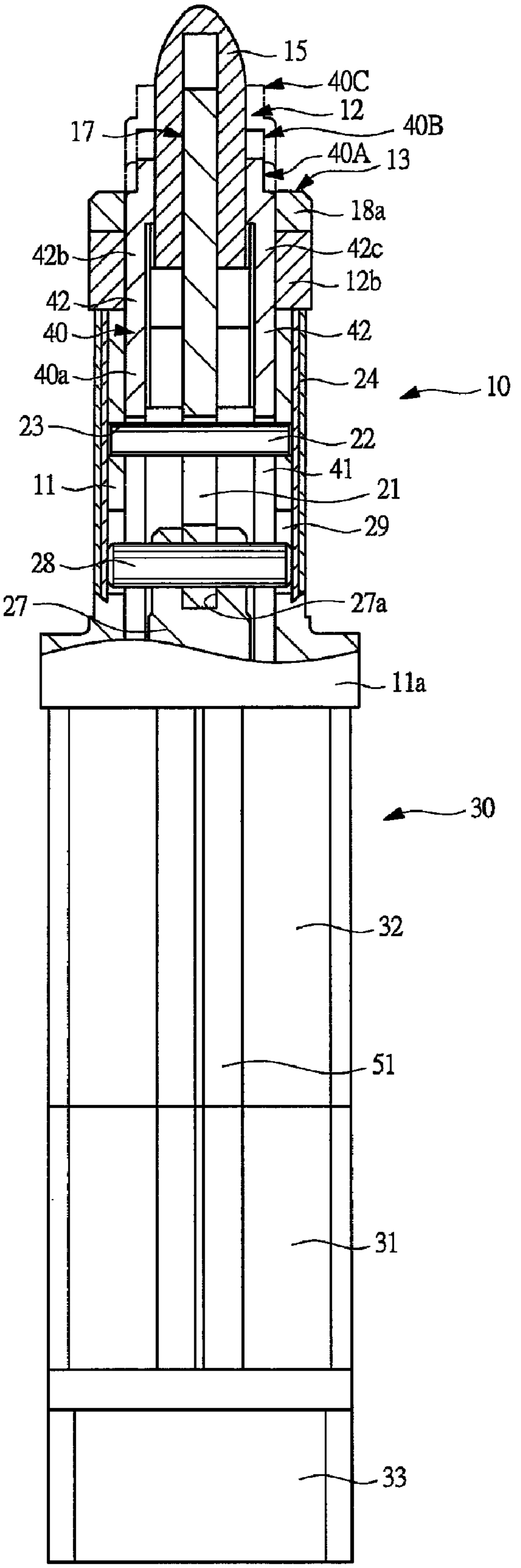
FIG. 3 is a partially broken side view as viewed from a direction of an arrow A in FIG. 2.

As shown in FIG. 2, a tip portion of the clamp arm 17 is accommodated in the locating jig 12, and is provided with the clamp piece 20 for clamping the panel material P between the workpiece supporting surface 19 and the clamp piece 20. A base end portion of the clamp arm 17 is accommodated in the mounting pedestal 11, and a cam hole 21 is formed in its base end portion. The cam hole 21 has: a straight portion 21*a* formed so as to extend in a longitudinal direction of the clamp arm 17; and a gradient portion 21*b* formed so as to incline from the end of the straight portion 21*a*. A cam pin 22 penetrates into the cam hole 21. As shown in FIG. 3, both end portions of the cam pin 22 are fixed into attachment holes 23 formed in the mounting pedestal 11.

As shown in FIG. 4, a connection hole 26 is formed in a base end portion of the clamp arm 17, thereby being connected to a tip portion of a piston rod 27. An arm attachment groove 27*a*, into which the base end portion of the clamp arm 17 enters, is formed in a tip portion of the piston rod 27, and the base end portion of the clamp arm 17 is inserted into this arm attachment groove 27*a*, so that the clamp arm 17 is swingablly connected to the piston rod 27 by a connecting pin 28, which is attached into a connection hole 27*b* formed in the tip portion of the piston rod 27 and penetrates through the connection hole 26 of the clamp arm 17. As shown in FIG. 3, both end portions of the connecting pin 28 are inserted into long holes 29 which are formed axially in the mounting pedestal 11, and length of each of these long holes 29 is approximately equal to that of a stroke of the piston rod 27.

Accordingly, when the piston rod 27 moves backward, the clamp arm 17 is axially moved backward together with the connecting pin 28 and the cam pin 22 entering into the straight portion 21*a* of the cam hole 21, so that the clamp piece 20 protrudes from inside the slit 16 and moves to the clamping position where the panel material P is clamped. On the other hand, when the piston rod 27 moves forward, the clamp arm 17 is axially moved forward together with the connecting pin 28 and the cam pin 22 enters into the gradient portion 21*b* of the cam hole 21, so that the clamp piece 20 moves to a retracted position of entering into the slit 16. Both end surfaces of each of the cam pin 22 and the connecting pin 28 are covered with a cover 24 fitted into the mounting pedestal 11, and, as shown in FIG. 1, slits 25, into which the cover 24 is fitted, are formed in a side face of the mounting pedestal 11.

Although one clamp arm 17 is accommodated in the slit 16 of the locating jig 12 in FIG. 2, two clamp arms 17 may be accommodated in the slit 16. In that case, since the two clamp arms 17 is oppositely arranged so that the clamp piece 20 protrudes from both sides of the slit 16 in clamping the panel material P, the panel material P can be fixed by the two clamp arms 17. The slit 16 is formed in the locating pin 15 so as to open on both sides of the locating pin 15 in a radial direction, but when the clamp arm 17 is caused to protrude only from one side of the locating pin, the slit 16 may be opened only on the side from which the clamp piece 20 protrudes.

As shown in FIG. 1, a cylinder body 30 is attached to the pedestal plate 11*a*. The cylinder body 30 has two cylinders, i.e., first and second cylinders 31 and 32 connected to each other, and an end cover 33 fixed to the cylinder 31. The cylinder 32 is fixed to the pedestal plate 11*a*, and the end cover 33 and the cylinders 31 and 32 are fastened by a plurality of bolts (not shown) which are attached to four corners of each of these cylinders 31 and 32 and the end cover 33.

Each of the cylinders 31 and 32 has an outer shape with a substantially square cross section, and, as shown in FIG. 2, cylinder chambers 31*a* and 32*a* axially penetrating are formed inside the respective cylinders, wherein the cylinder chambers are partitioned by a partition wall 34. The partition wall 34 is attached between both of the cylinders 31 and 32 so as to partition the cylinder chambers 31*a* and 32*a*, and the piston rod 27 slidably penetrates in each radial-directional center portion of the cylinders. Respective seal members are put for sealing between the partition wall 34 and the two cylinder chambers 31*a* and 32*a* and between the piston rod 27 and the partition wall 34. On the other hand, a cylinder chamber 33*a*, which has a smaller diameter than that of the cylinder chamber 31*a* and communicates with the cylinder chamber 31*a*, is formed in the end cover 33.

An opening/closing piston 35 is fixed to a base end portion of the piston rod 27 and is accommodated slidably in the cylinder chamber 31*a*. The opening/closing piston 35 partitions the cylinder chamber 31*a* into an advance fluid chamber 36*a* between the opening/closing piston 35 and the end cover 33 and a retreat fluid chamber 36*b* between the opening/closing piston 35 and the partition 34. A seal member provided to the opening/closing piston 35 is put for sealing between the advance fluid chamber 36*a* and the retreat fluid chamber 36*b*. The cylinder 31 is provided with an advance supply/exhaust port 37*a* communicating with the advance fluid chamber 36*a* and a retreat supply/exhaust port 37*b* communicating with the retreat fluid chamber 36*b*.

When compressed air is supplied from the advance supply/exhaust port 37*a* to the advance fluid chamber 36*a*, the opening/closing piston 35 is driven in a forward direction and the clamp arm 17 is driven up to the retracted position through the piston rod 27. On the other hand, when compressed air is supplied from the retreat supply/exhaust port 37*b* to the retreat fluid chamber 36*b*, the opening/closing piston 35 is driven in a backward direction and the clamp arm 17 is driven up to the clamping position through the piston rod 27. A compression coil spring 38 for applying a spring force to the opening/closing piston 35 toward the advance position is mounted between the opening/closing piston 35 and the end cover 33. Therefore, even when supply of compressed air to the advance fluid chamber 36*a* is stopped, this spring force due to the compression coil spring holds the clamp arm 17 at the retracted position so that the clamp piece 20 does not protrude from the slit 16.

An extruding member 40 is mounted axially reciprocably on the workpiece support 10. The extruding member 40 has a cylindrical portion 40*a*. As shown in FIG. 4, long holes 41 through which both of the cam pin 22 and the connecting pin 28 penetrate are formed in the cylindrical portion 40*a* so that the cylindrical portion 40*a* does not interfere with the cam pin 22 and the connecting pin 28 when the extruding member 40 reciprocates.

Figure 5A:
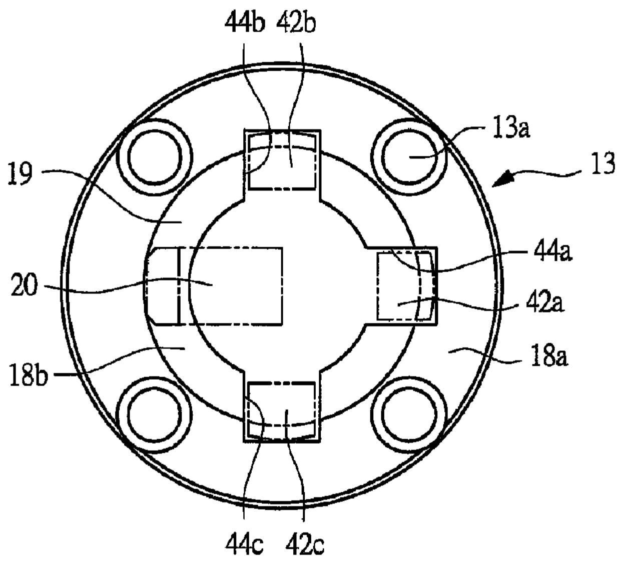
FIG. 5A is a plan view of a workpiece receiving ring.
Figure 5B:
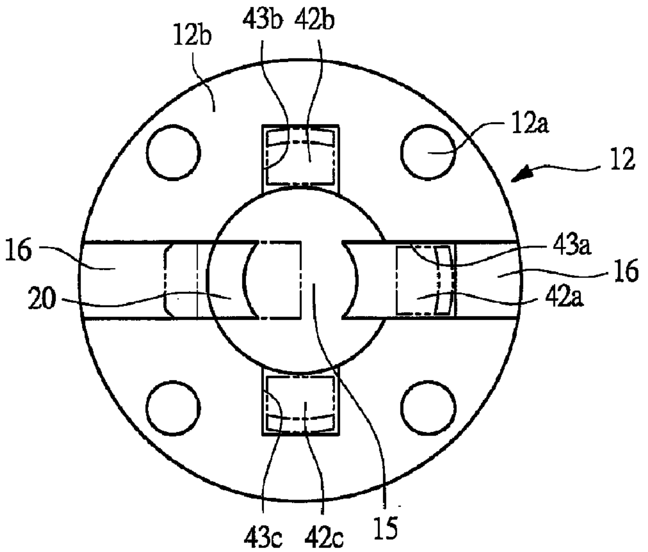
FIG. 5B is a plan view of a locating jig.
Figure 5C:
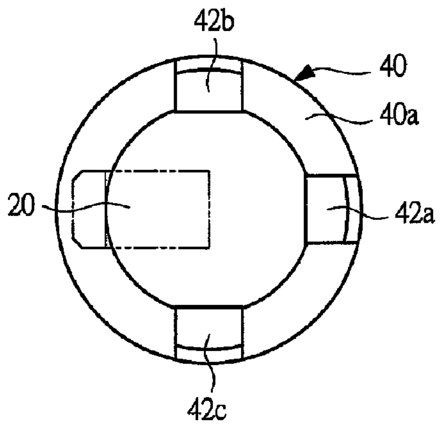
FIG. 5C is a plan view of an extruding member.

FIG. 5A is a plan view of the workpiece receiving ring; FIG. 5B is a plan view of the locating jig; and FIG. 5C is a plan view of the extruding member.

The extruding member 40 has three bar-shaped extruding rods 42*a*, 42*b*, and 42*c* protruding from a tip of the cylindrical portion 40*a*. As shown in FIG. 5C, the clamp piece 20 of the clamp arm 17 accommodated in the extruding member 40, and the three extruding rods 42*a*, 42*b*, and 42*c* are circumferentially spaced 90 degrees from each other. More specifically, the extruding rod 42*a* is disposed at a location of being circumferentially 180 degrees apart from the clamp piece 20, and the other extruding rods 42*b* and 42*c* are each offset circumferentially 90 degrees from the extruding rod 42*a*. However, the number of extruding rods is not limited to three, and an interval between circumferential locations is not limited to 90 degrees either.

Tip portions of extruding rods 42*a* to 42*c* is, as shown in FIG. 4, bent radially inwardly and extend axially, and their inner diameters are approximately equal to the outer diameter of the base end portion of the locating pin 15 and their outer diameters are approximately equal to the outer diameter of the support portion 18*b* of the workpiece receiving ring 13. On the other hand, as shown in FIGS. 5A and 5B, three rod guide grooves 43*a* to 43*c* and 44*a* to 44*c* are formed respectively in the locating jig 12 and the workpiece receiving ring 13 correspondingly to the extruding rods 42*a* to 42*c* so as to be opened with respect to an opening face of the locating pin 15, wherein the extruding rods 42*a* to 42*c* enters into the rod guide grooves 43*a* to 43*c* and 44*a* to 44*c*, respectively. The two extruding rods 42*b* and 42*c* contact with the outer circumferential surface of the locating pin 15, and the other extruding rod 42*a* is provided at a location of the slit 16. Although the workpiece support face 19 that is the tip surface of the support portion 18*b* is not annular, when the tip surfaces of the extruding rods 42*a* to 42*c* arrive at the same location as that of the workpiece support face 19, the tip surfaces of the extruding rods 42*a* to 42*c* and the workpiece support face 19 form an approximately annular and flat workpiece support face.

As shown in FIG. 2, a partition wall 48, which partitions the cylinder chamber 32*a* into a tip-side chamber and a base-end-side chamber, is attached to the cylinder 32. The piston rod 27, and a hollow shaft 46 fitted slidably in the piston rod 27 outside the piston rod 27 penetrate through this partition wall 48. A hollow piston 57 is attached to a base end portion of the hollow shaft 46, and the base end side of the cylinder chamber 32*a* is partitioned by the hollow piston 57 into an advance fluid chamber 58*a* between the partition wall 34 and the hollow piston 57 and a retreat fluid chamber 58*b* between the partition wall 48 and the hollow piston 57.

Two protruding members 55 are fixed, as shown in FIG. 4, in attaching holes 53 formed at a tip of the hollow shaft 46, and the protruding members 55 enter, as shown in FIG. 4, into and are engaged with engaging grooves 54 that are formed in the cylindrical portion 40*a* of the extruding member 40 so as to extend axially. The extruding member 40 is connected to the hollow shaft 46 via the protruding member 55, and is moved within a range of a stroke S with respect to the hollow shaft 46 in an idle swing manner, i.e., is swingable. An advance supply/exhaust port 59*a* communicating with the advance fluid chamber 58*a*, and a retreat supply/exhaust port 59*b* communicating with the retreat fluid chamber 58*b* are formed in the cylinder 32. As shown in FIG. 2, when compressed air is supplied from the advance supply/exhaust port 59*a* while the extruding member 40 is at the retreat position, the extruding member 40 is driven from a workpiece supporting position 40A of FIG. 2 to a carry-out position 40C, which is the advance position, via the protruding member 55 contacting with engagement faces located on the tip sides of the engaging grooves 54.

As shown in FIG. 2, an annular member 45 is incorporated into the cylinder chamber between a sleeve 47 fixed to the tip of the cylinder 32 and the partition wall 48. A rear end of the extruding member 40 abuts on the annular member 45, and the annular member 45 is axially movable between the partition wall 48 and the sleeve 47. The piston rod 27 and the hollow shaft 46 penetrate through the annular member 45. Mounted between the annular member 45 and the partition wall 48 is a compression coil spring 49 as a spring member for applying a forward-directional spring force to the extruding member 40 through the annular member 45. Accordingly, when the hollow piston 57 is at the retreat position as shown in FIG. 2, the extruding member 40 is driven by a spring force applied to the annular member 45 due to the compression coil spring 49, from the workpiece supporting position 40A where the tip face of the extruding member 40 coincides with the workpiece supporting face 19, to a standby position 40B presented between the workpiece supporting position 40A and the carry-out position 40C. Because the annular member 45 and the extruding member 40 are moved forward by the compression coil spring 49 at the standby position 40B, engagement faces located on retreat sides of the engaging grooves 54 contact with the protruding member 55.

When the panel material P is positioned by the locating pin 15, the opening/closing piston 35 is preliminarily at the advance position and the hollow piston 57 is preliminarily at the backward position. At this time, the extruding member 40 is at the standby position in a state in which its tip portion protrudes from the workpiece support surface 19. The extruding member 40 holds standby, at this standby position, for carrying in the panel material P. When the panel material P is carried in and the locating pin 15 is inserted into the positioning hole, the extruding rods 42*a* to 42*c* are pushed down by the panel material P and enter into the workpiece receiving ring 13, and the extruding member 40 is moved in an idle swing manner with respect to the hollow shaft 46 and then moves backward to the workpiece supporting position 40A shown by the sold lines of FIG. 3. Thereby, the panel material P is supported on the workpiece support surface, which is formed annularly by the workpiece support surface 19 of the workpiece receiving ring 13 and the tip faces of the extruding rods 42*a* to 42*c*. Accordingly, the annular member 45 is also pushed down against the spring force by the retreat movement of the extruding member 40 and is moved to the retreat position.

A magnet 50 is incorporated into the annual member 45. At a location corresponding to the retreat position of the annular member 45 in a sensor attachment groove 51 formed in a side face of the cylinder body 30 shown in FIG. 1, as shown by double-doted lines of FIG. 2, a magnetic sensor 52 sensing a magnetic force is attached as detecting means. Because the magnetic sensor 52 detects the magnetic force of the magnet 50, it is detected for the annular member 45 to arrive at the retreat position. Therefore, after the panel material P is carried in and the extruding member 40 is moved backward, it is possible to detect a state of supporting the panel material P by the workpiece supporting face, so that supply/exhaust of compressed air for driving the positioning and clamping apparatus is controlled.

One magnetic sensor 52 for detecting the retreat position of the annular member 45 is attached to the positioning and clamping apparatus shown in FIG. 2, but the magnetic sensors 52 for detecting the advance position and the retreat position of the annular member 45 may be attached individually one-by-one. In this case, one magnetic sensor 52 may be attached at a location corresponding to the advance position of the annular member 45 in each of the sensor attachment grooves 51, and one magnetic sensor 52 at a location corresponding to the retreat position. Also, the sensor attachment grooves 51 are formed in three side faces except for the side face in which the supply/exhaust port of the cylinder body 30 is formed, but the magnetic sensor 52 may be also attached to any of the three side faces.

As shown in FIG. 2, a stepped portion 56 is provided to an inner wall of a rear end portion of the extruding member 40, and since the protruding member 55 contacts with the engagement surface on a tip side of the engagement groove 54 and a tip surface of the hollow shaft 46 abuts on this stepped portion 56, the retreat movement of the extruding member 40 is restricted with respect to the hollow shaft 46. The retreat movement of the extruding member 40 to the hollow shaft 46 may be restricted only by contact of the protruding member 55 to the engagement surface of the engaging groove 54. Also, the protruding member 55 may be provided to the cylindrical portion 40*a* of the extruding member 40, and the engaging groove 54 may be provided to the hollow shaft 46.

When the hollow piston 57 is at the retreat position while the clamp arm 17 is at the retracted position, the extruding member 40 is axially movable in an idle swing manner between the standby position where its tip portion protrudes from the workpiece supporting face 19 and the workpiece supporting position of coinciding with the workpiece supporting face 19. On the other hand, when the hollow piston 57 is driven up to the advance position, the extruding member 40 is driven from the standby position to the carry-out position by contact of the protruding member 55 to the engagement surface located on the tip side of the engaging groove 54. When the panel material P whose welding has been completed is carried out, the carry-out of the panel material P can be facilitated by moving the extruding member 40 up to the carry-out position. More specifically, when the panel material P is carried out at the workpiece supporting position in a state in which the locating pin 15 is fitted in the positioning hole of the panel material P, a carry-out operation becomes complicated because the panel material P must be carried out along the axial direction of the locating pin 15. However, since the panel material P can be carried out at the carry-out position where the panel material P is pushed up to an upper portion of the locating pin 15, an operation of carrying out the panel material P along the axial direction of the locating pin 15 is unnecessary, whereby the carry-out of the panel material P is facilitated. Incidentally, when the extruding member 40 is at the carry-out position, the panel material P is pushed out up to a location of the tip of the locating pin 15. However, the panel material P can be extruded up to a front location of the locating pin 15 when a motion stroke of the extruding member 40 to the hollow shaft 46 is set long.

Similarly to the annular member 45, by incorporating magnets 60 and 61 into the opening/closing piston 35 and the hollow piston 57, positions of the opening/closing piston 35 and the hollow piston 57 are detected. The incorporation of the magnet 60 into the opening/closing piston 35 allows detecting whether or not the panel material P is clamped. Also, the incorporation of the magnet 61 into the hollow piston 57 allows detecting whether or not the extruding member 40 arrives at the carry-out position. Each magnetic sensor is attached to the side face of the cylinder body 30 similarly to the magnetic sensor 52.

As shown in FIG. 2, the end cover 33 protrudes and extends from a bottom face of the cylinder body 30, and a lock cylinder chamber 62 is formed inside the end cover 33. The lock cylinder chamber 62 is composed of a large diameter portion opened in the side face, and a small diameter portion communicating with the cylinder chamber 33*a*, wherein a cap 63 is attached to the opened side face. Fixed to the piston rod 27 is an extension portion 27*c* which enters into the cylinder chamber 33*a*. Accommodated in the lock cylinder chamber 62 is a locking member 65, which has a lock piston 64 at the large diameter portion and extends to the small diameter portion. A tip of the locking member 65 serves as a locking portion which enters into a locking groove 66 formed in the extension portion 27*c* of the piston rod 27. The lock cylinder chamber 62 is partitioned, by the lock piston 64, into a fluid pressure chamber 67*a* communicating with the cylinder chamber 33*a* and an atmospheric pressure chamber 67*b* presented between the locking member 65 and the cap 63, wherein a seal member is put for sealing between the lock piston 64 and an inner surface of the lock cylinder chamber 62. The fluid pressure chamber 67*a* communicates with the advance supply/exhaust port 37*a*, and the advance supply/exhaust port 37*a* communicates with the advance fluid chamber 36*a* through the cylinder chamber 33*a*. On the other hand, the atmospheric pressure chamber 67*b* communicates with the outside through a gap formed between the cap 63 and the end cover 33.

The locking member 65 is accommodated slidably in the lock cylinder chamber 62, and is movable forward and backward between a advance limit locking position where the locking member 65 enters into the locking groove 66 formed in the extension portion 27*c* to fix the piston rod 27 while the piston rod 27 is at the retreat position, and a retreat limit unlocking position where the locking is released. A compression coil spring 68 is mounted between the locking member 65 and the cap 63, whereby a spring force is biased to the locking member 65 by this compression coil spring 68 in a direction of moving forward toward a locked position. Accordingly, when the piston rod 27 arrives at the retreat position, the locking member 65 is moved forward up to the locked position by the spring force and fixes the piston rod 27, thereby making it possible to fix the panel material P in a clamped state. On the other hand, when compressed air is supplied from the advance supply/exhaust port 37*a*, the locking member 65 is moved backward up to a unlocked position to release the locking of the piston rod 27. At this time, because the fluid pressure chamber 67*a* communicates with the advance fluid chamber 36*a*, the locking of the piston rod 27 by the locking member 65 is released and the opening/closing piston 35 can be moved forward to cause the clamp arm 17 to be moved forward up to the retracted position through the piston rod 27.

Figure 6:
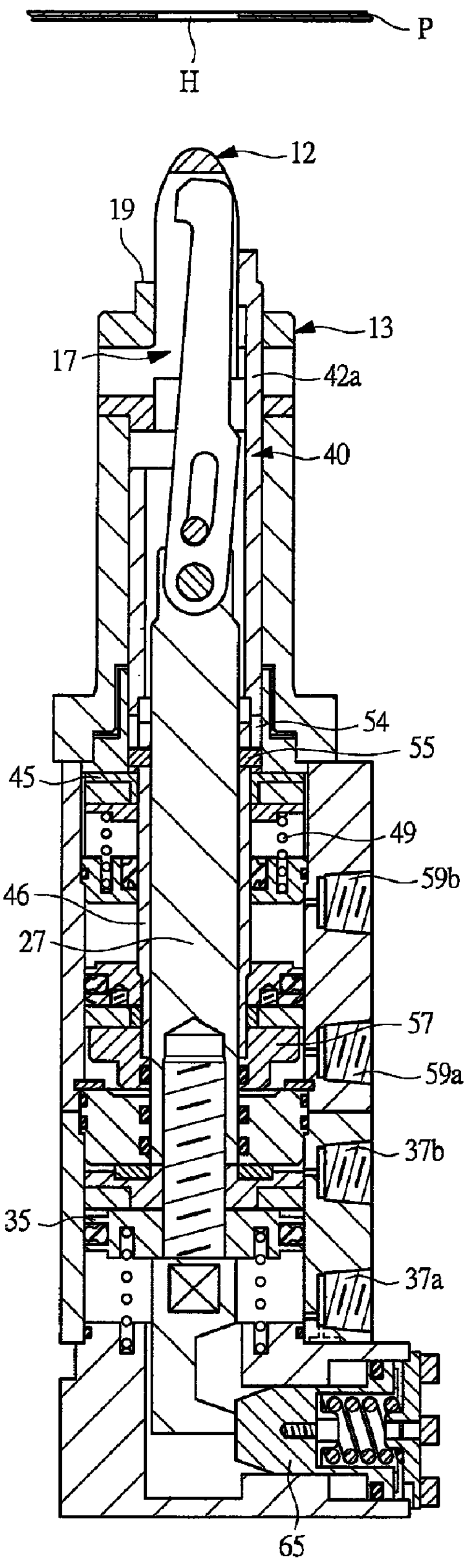
FIG. 6 is a sectional view showing an operation process of the positioning and clamping apparatus according to the present invention.
Figure 7:
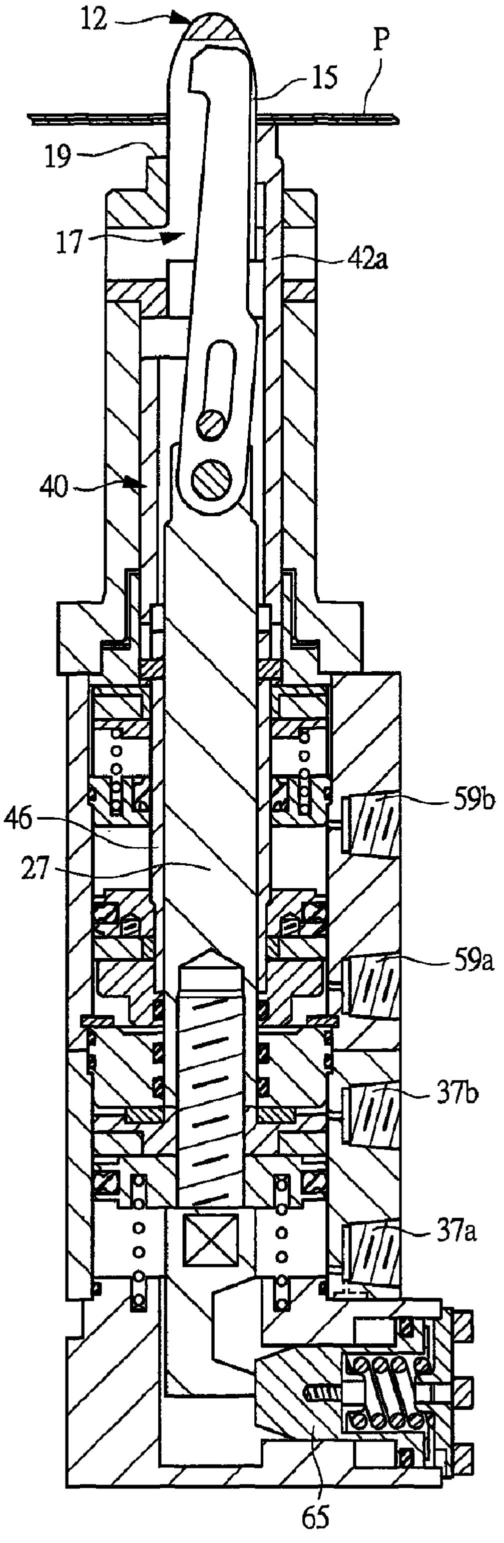
FIG. 7 is a sectional view showing an operation process of the positioning and clamping apparatus according to the present invention.

Next, an operation process of a positioning and clamping apparatus according to the present invention will be described. FIGS. 6 to 12 are sectional views showing an operation process of a positioning and clamping apparatus according to the present invention. FIG. 6 shows a state before the panel material P is carried in, wherein by compressed air supplied from the advance supply/exhaust port 37*a*, the opening/closing piston 35 is moved to the advance position and the clamp arm 17 is at the retracted position, and the locking member 65 is at the unlocked position. At this time, the hollow piston 57 is moved to the retreat position and the hollow shaft 46 is at the retreat position, and the extruding member 40 is at the standby position so that the extruding rods 42*a* to 42*c* protrude from the workpiece supporting face 19 by the annular member 45 located at the advance position due to the spring force of the compression coil spring 49. The advance limit position of the extruding member 40 is restricted by the protruding member 55 attached to the tip portion of the hollow shaft 46 being engaged with an engagement surface located on the rear end side of the engagement groove 54. In this state, as shown in FIG. 7, when the locating pin 15 is inserted into a positioning hole "H" of the panel material P, the panel material P contacts with the tip faces of the extruding rods 42*a* to 42*c*.

Figure 8:
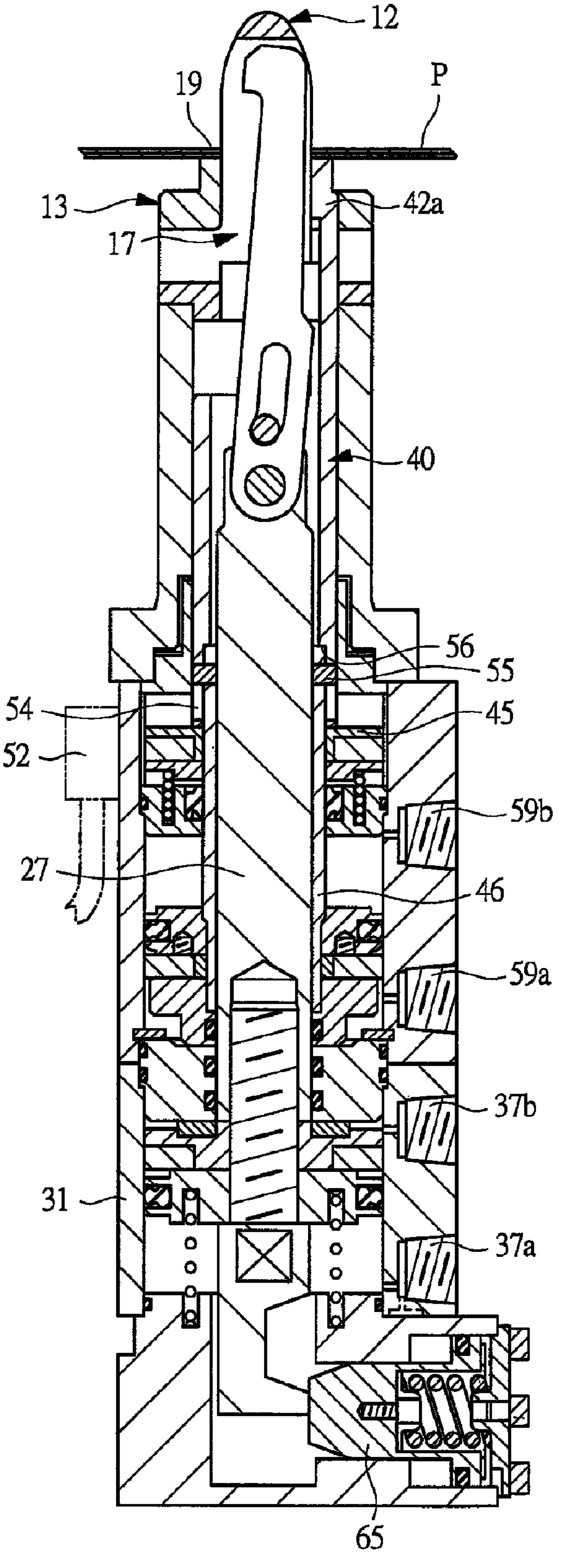
FIG. 8 is a sectional view showing an operation process of the positioning and clamping apparatus according to the present invention.

The carried-in panel material P pushes down the extruding member 40, and is engaged with the locating pin 15 for positioning. By the panel material P, the extruding member 40 is moved backward while pushing down the annular member 45 against the spring force. As shown in FIG. 8, when the extruding member 40 is moved backward until the tip face of the extruding rods 42*a* to 42*c* arrives at a location of the workpiece supporting face 19, the annular member 45 is moved up to the retreat position.

Figure 9:
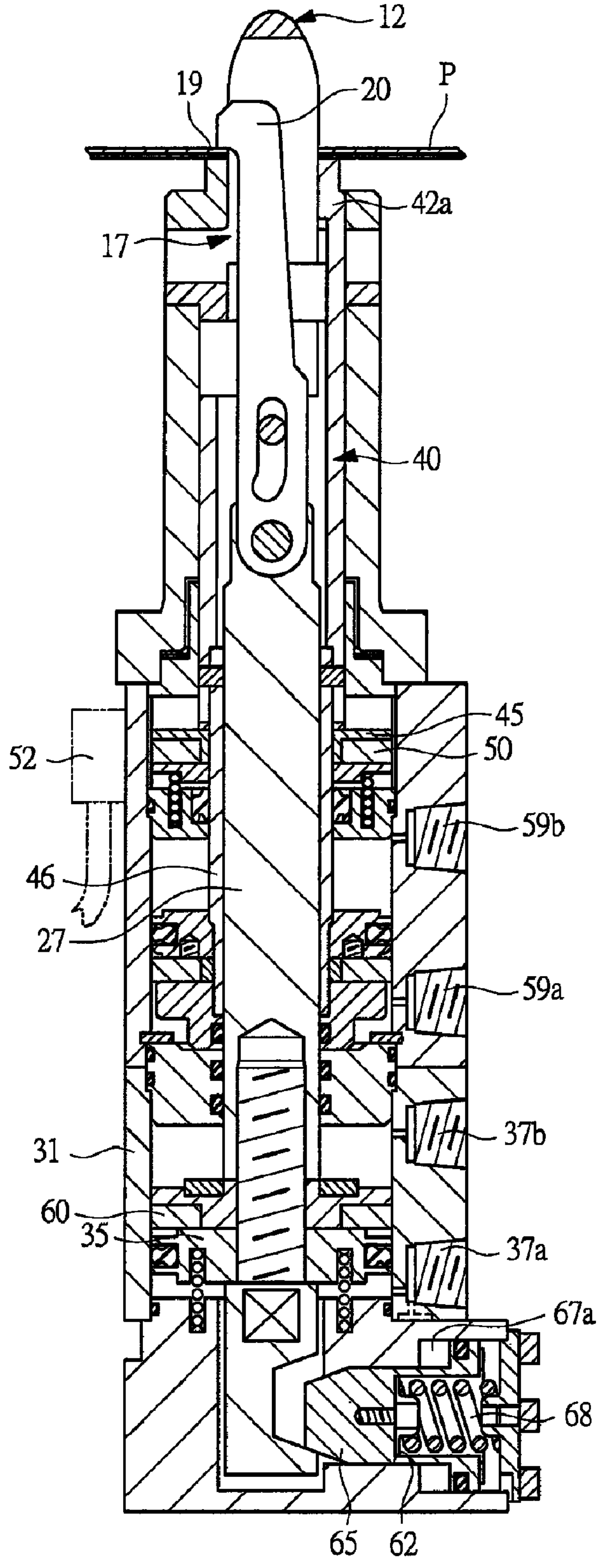
FIG. 9 is a sectional view showing an operation process of the positioning and clamping apparatus according to the present invention.

When the annular member 45 arrives at the retreat position, this is detected by the magnetic sensor 52 and then an electromagnetic valve (not shown) is controlled by a signal from the magnetic sensor 52, whereby supply of compressed air to the cylinder 31 is shifted. When compressed air is supplied from the retreat supply/exhaust port 37*b* while the panel material P is supported on the workpiece supporting face 19, as shown in FIG. 9, the clamp arm 17 is moved backward up to the clamping position, whereby the panel material P is clamped between the workpiece supporting face 19 and the clamp piece 20. At this time, because the compressed air in the fluid pressure chamber 67*a* of the locking cylinder chamber 62 is exhausted from the advance supply/exhaust port 37*a*, the locking member 65 is moved forward up to the locked position by the spring force of the compression coil spring 68, thereby fixing the piston rod 27. While the panel material P is clamped, the panel material P is welded by a welding machine. In order to detect completion of the clamping of the panel material P by the clamp arm 17, the magnet 60 is provided in the opening/closing piston 35, and the magnetic sensor is provided in the cylinder 31.

Figure 10:
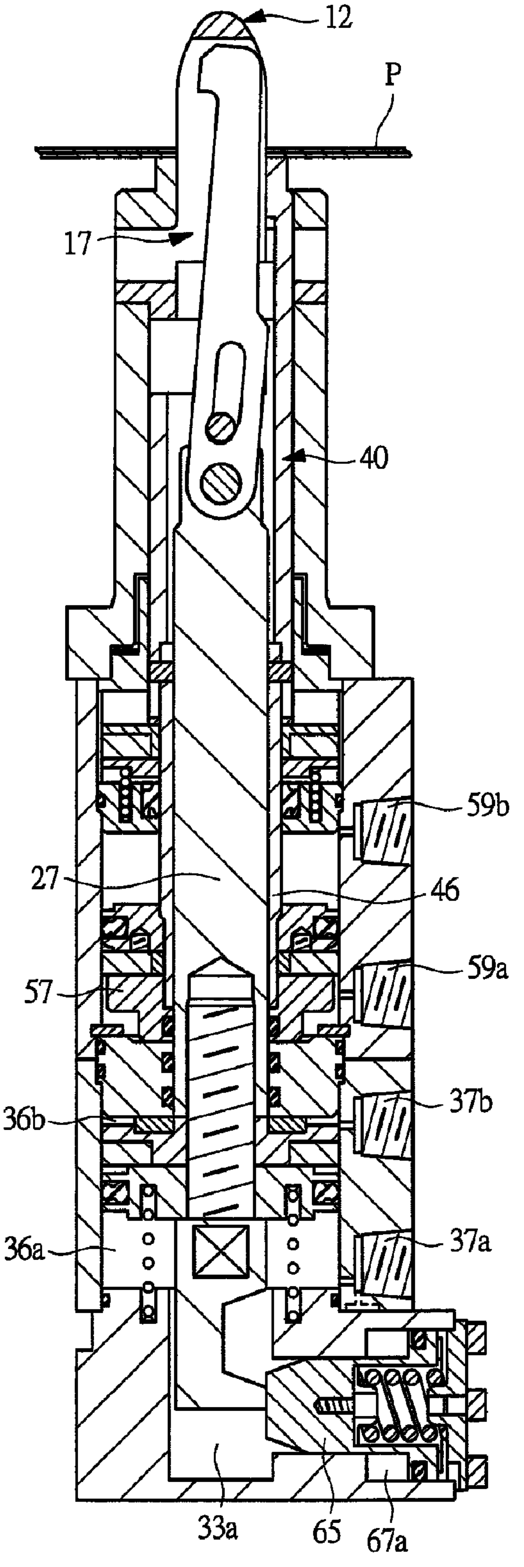
FIG. 10 is a sectional view showing an operation process of the positioning and clamping apparatus according to the present invention.

When the panel material P is carried out after completion of the welding of the panel material P, first as in FIG. 10, compressed air is supplied to the advance supply/exhaust port 37*a*. Because the compressed air supplied to the advance supply/exhaust port 37*a* is supplied to the fluid pressure chamber 67*a* and the cylinder chamber 33*a* through the advance fluid chamber 36*a*, the piston rod 27 is moved forward to move the clamp arm 17 forward up to the retracted position and the locking member 65 is moved backward up to the unlocked position.

Figure 11:
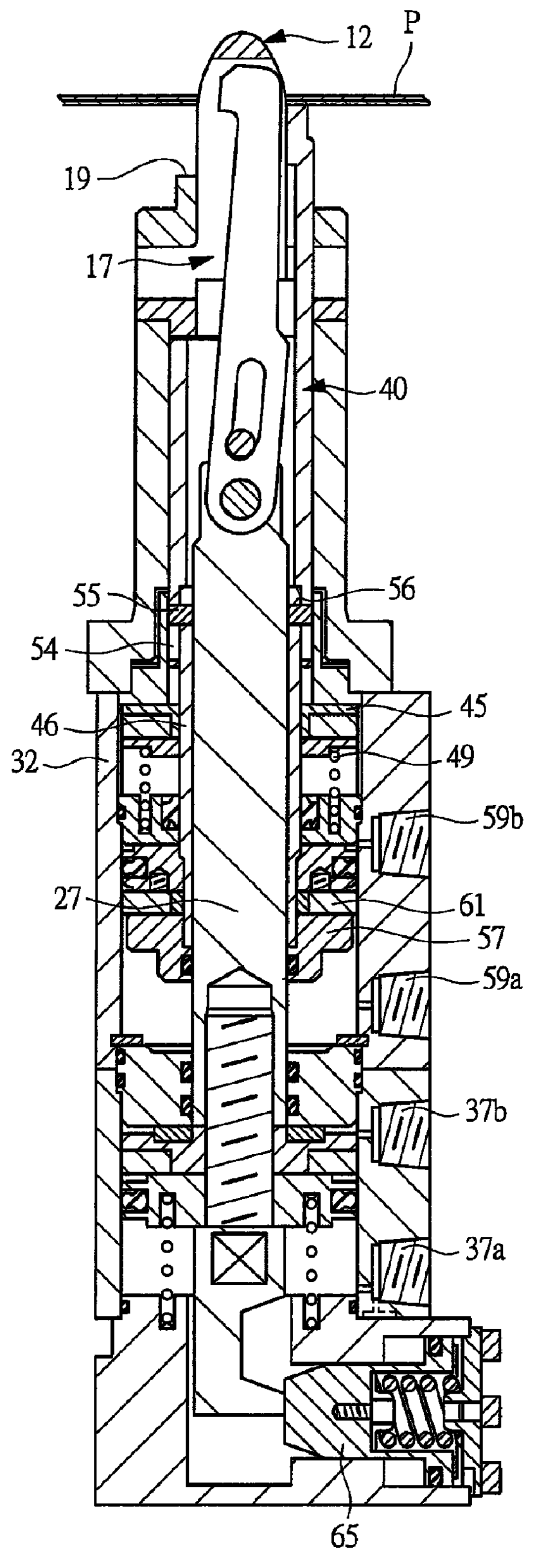
FIG. 11 is a sectional view showing an operation process of the positioning and clamping apparatus according to the present invention.
Figure 12:
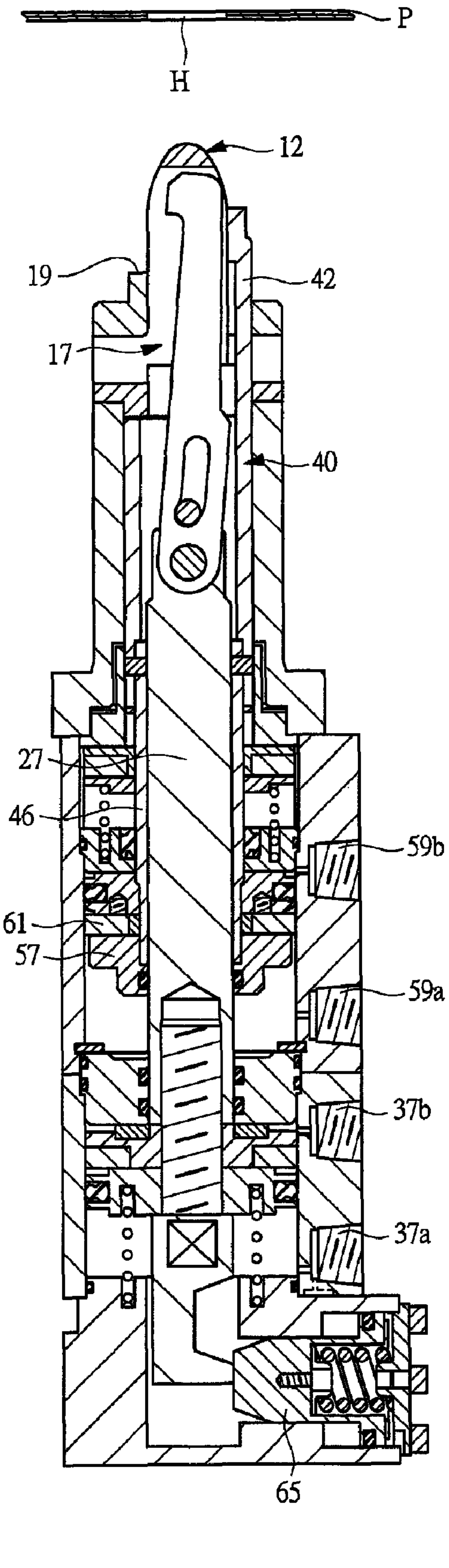
FIG. 12 is a sectional view showing an operation process of the positioning and clamping apparatus according to the present invention.

Subsequently, when compressed air is supplied from the advance supply/exhaust port 59*a*, the hollow piston 57 is moved up to the advance position and the hollow shaft 46 is moved forward. For this reason, as shown in FIG. 11, the stepped portion 56 abuts on the tip face of the hollow shaft 46, and the protruding member 55 contacts with the engagement face of the engaging groove 54, whereby the extruding member 40 is driven up to the carry-out position and the panel material P is caused to protrude. At this time, the annular member 45 is driven up to the advance position by the spring force of the compression coil spring 49. Under this state, as shown in FIG. 12, the panel material P is carried out from the carry-out position by a carrying apparatus (not shown). Pushing-up of the panel material P to the carry-out position by the extruding member 40 is detected by the magnetic sensor, which senses the magnet 61 provided in the hollow piston 57.

Thus, the extruding member 40 protruding from the workpiece supporting face 19 to push up the panel material P is provided to the workpiece support 10, and the panel material P is carried out at the carry-out position where the panel material P whose welding is completed is pushed up to the tip of the locating pin 15, so that carrying-out of the panel material P axially along the locating pin 15 is not required, whereby the carrying-out of the panel material P is facilitated. Furthermore, in order to detect that the carried-in panel material P is supported by the workpiece supporting face 19, it is detected that the extruding member 40 is moved backward by the panel material P from the standby position and arrives at the workpiece supporting position, so that the carrying-out of the panel material P can be also detected by using the extruding member 40 which pushes up and carries out the panel material P from the workpiece supporting position to the carry-out position.

The present invention is not limited to the above-described embodiments, and may be variously modified without a scope of not departing from the gist of the invention. For example, although there has been described a case where this positioning and clamping apparatus is used in its upward state as shown in FIG. 2, the positioning and clamping apparatus is not limited to the case of use of its upward state and may be also used in a horizontal or incline direction, or in a downward state.

What is claimed is:

1. A positioning and clamping apparatus comprising:

a workpiece support including a workpiece supporting face, with which a panel material contacts on its tip;

a locating pin protruding from the workpiece supporting face to be attached to the workpiece support, the locating pin being fitted in a positioning hole formed in a panel material;

a clamp arm accommodated in a slit formed radially openly in the locating pin, the clamp arm being swingable between a clamping position of protruding from the slit to clamp the panel material between the workpiece supporting face and the clamp arm, and a retracted position of entering into the slit;

an opening/closing piston incorporated into a cylinder body attached to the workpiece support, attached to a piston rod connected to the clamp arm, and driving the clamp arm to the clamping position and the retracted position through the piston rod;

an extruding member mounted axially reciprocably on the workpiece support along the locating pin between a carry-out position where a tip portion of the extruding member protrudes from the workpiece supporting face to extrude the panel material and a workpiece supporting position where the tip portion of the extruding member enters into the workpiece support;

a hollow piston connected to the extruding member to be incorporated into the cylinder body, and driving the extruding member from the workpiece supporting position to the carry-out position;

a hollow shaft attached to the hollow piston, and connected to the extruding member, wherein the piston rod penetrates through the hollow piston, the hollow piston, the opening/closing piston, and the piston rod are coaxially arranged on an axis, and incorporated into the cylinder body, and when the hollow piston drives the extruding member to the workpiece supporting position from the carry-out position, the tip portion of the extruding member protrudes from the workpiece supporting face to push up and carries out the panel material from the workpiece supporting position to the carry-out position;

a spring member provided in the cylinder body, and applying a spring force to the extruding member in a forward direction to cause the extruding member to move forward up to a standby position located between the workpiece supporting position and the carry-out position and to cause the extruding member to move backwards up to the workpiece supporting position by weight of the panel material placed on the workpiece supporting face while the extruding member is at the standby position;

a detecting means provided in the cylinder body and detecting a position of the extruding member;

a radially-outwardly protruding member provided to one of the hollow shaft and the extruding member; and an engaging groove provided to a cylindrical portion of the other of the hollow shaft and the extruding member, and engaged with the protruding member and extending axially, wherein the extruding member is connected to the hollow shaft through the protruding member, and the extruding member is moved in an idle swing manner with respect to the hollow shaft from the standby position to the workpiece supporting position after being moved to the standby position from the carry-out position together with the hollow shaft.

2. The positioning and clamping apparatus according to claim 1, wherein the detecting means is a magnetic sensor for detecting magnetism of a magnet moved forward and backward between the standby position and the workpiece supporting position together with the extruding member.

3. A positioning and clamping apparatus comprising:

a workpiece support including a workpiece supporting face, with which a panel material contacts on its tip;

a locating pin protruding from the workpiece supporting face to be attached to the workpiece support, the locating pin being fitted in a positioning hole formed in a panel material;

a clamp arm accommodated in a slit formed radially openly in the locating pin, the clamp arm being swingable between a clamping position of protruding from the slit to clamp the panel material between the workpiece supporting face and the clamp arm, and a retracted position of entering into the slit;

an opening/closing piston incorporated into a cylinder body attached to the workpiece support, attached to a piston rod connected to the clamp arm, and driving the clamp arm to the clamping position and the retracted position through the piston rod;

an extruding member mounted axially reciprocably on the workpiece support along the locating pin between a carry-out position where a tip portion of the extruding member protrudes from the workpiece supporting face to extrude the panel material and a workpiece supporting position where the tip portion of the extruding member enters into the workpiece support;

a hollow piston connected to the extruding member to be incorporated into the cylinder body, and driving the extruding member from the workpiece supporting position to the carry-out position;

a hollow shaft attached to the hollow piston, and connected to the extruding member, wherein the piston rod penetrates through the hollow piston, the hollow piston, the opening/closing piston, and the piston rod are coaxially arranged on an axis, and incorporated into the cylinder body, and when the hollow piston drives the extruding member to the workpiece supporting position from the carry-out position, the tip portion of the extruding member protrudes from the workpiece supporting face to push up and carries out the panel material from the workpiece supporting position to the carry-out position;

a spring member provided in the cylinder body, and applying a spring force to the extruding member in a forward direction to cause the extruding member to move forward up to a standby position located between the workpiece supporting position and the carry-out position and to cause the extruding member to move backwards up to the workpiece supporting position by weight of the panel material placed on the workpiece supporting face while the extruding member is at the standby position;

a detecting means provided in the cylinder body and detecting a position of the extruding member; and an annular member provided in the cylinder body, and moved forward and backward between the standby position and the workpiece supporting position together with the extruding member, wherein the detecting means is a magnetic sensor for detecting magnetism of a magnet moved forward and backward between the standby position and the workpiece supporting position together with the extruding member, and the magnet is attached to the annular member.

* * * * *